US008441997B2

(12) United States Patent
Yun et al.

(10) Patent No.: US 8,441,997 B2
(45) Date of Patent: May 14, 2013

(54) REMOTE MANAGEMENT SYSTEM FOR SELF-ORGANIZING FEMTOCELLS

(75) Inventors: Jungnam Yun, Redmond, WA (US); Keun Ryol Park, Gyeonggi-do (KR); Seong Dong Park, Kyeongsang-do (KR); Yerang Hur, Seoul (KR)

(73) Assignees: Juni America, Inc., Redmond, WA (US); Juni Korea Co., Ltd., Seongnam-si (KR)

( * ) Notice: Subject to any disclaimer, the term of this patent is extended or adjusted under 35 U.S.C. 154(b) by 469 days.

(21) Appl. No.: 12/771,215

(22) Filed: Apr. 30, 2010

(65) Prior Publication Data

US 2011/0268044 A1    Nov. 3, 2011

(51) Int. Cl.
*H04W 4/00* (2009.01)
*H04J 3/16* (2006.01)

(52) U.S. Cl.
USPC .......................................... 370/329; 370/465

(58) Field of Classification Search .................. None
See application file for complete search history.

(56) References Cited

U.S. PATENT DOCUMENTS

| 2005/0013278 | A1  | 1/2005 | Kim .............................. 370/341 |
| 2008/0080399 | A1* | 4/2008 | Wang et al. .................... 370/254 |
| 2008/0167003 | A1* | 7/2008 | Wang et al. .................... 455/411 |
| 2009/0047968 | A1* | 2/2009 | Gunnarsson et al. .......... 455/446 |
| 2009/0221287 | A1* | 9/2009 | Balasubramanian et al. 455/434 |
| 2010/0093358 | A1* | 4/2010 | Cheong et al. ................ 455/444 |
| 2010/0159899 | A1* | 6/2010 | Horn et al. ................. 455/414.1 |
| 2010/0197307 | A1* | 8/2010 | Horn et al. ................. 455/435.1 |
| 2010/0199326 | A1* | 8/2010 | Singh et al. ........................ 726/3 |
| 2011/0201354 | A1* | 8/2011 | Park et al. .................. 455/456.1 |

FOREIGN PATENT DOCUMENTS

| KR | 10-2004-0072747 | 8/2004 |
| WO | 2009/094264 A2 | 7/2009 |

OTHER PUBLICATIONS

AirHop Communications, retrieved Jul. 1, 2010, from http://www.airhopcomm-web.com/, 1 page.
AirHop Communications, "Evolved Self-Organized Networking for Successfully Deploying High Performance 4G/LTE Networks" retrieved Jul. 1, 2010, from http://www.airhopcomm.com/download/eSon_wp.pdf, 6 pages.
Motorola USA, "SON (Self-Organized Network)" retrieved Jul. 1, 2010, from http://www.motorola.com/Business/US-EN/Business+Product+and+Services/LTE/SON_US-EN, 1 page.

(Continued)

*Primary Examiner* — Eunsook Choi
(74) *Attorney, Agent, or Firm* — Seed IP Law Group PLLC

(57) ABSTRACT

A method for initialization of a remote femto base station by a remote management system in a radio access network, the method comprising: powering on the femto base station; transmitting an initial configuration file from the remote management system to the femto base station; initializing the femto base station with the initial configuration file; scanning neighbor femto base stations; transmitting the results of the scanning of neighbor femto base stations and transmitting the femto base station location information to the remote management system; the remote management system setting a neighbor list and radio frequency parameters in response to receipt of the transmission from the femto base station; generating an updated configuration file based on the generated neighbor list and radio frequency parameters; transmitting the updated configuration file to the femto base station; and applying the updated configuration file at the femto base station and starting operation.

17 Claims, 7 Drawing Sheets

Remote Management System and Self-Organizing Component

OTHER PUBLICATIONS

NEC, "Self Organizing Network—NEC's proposals for next-generation radio network management" Feb. 2009, retrieved on Jul. 1, 2010, from http://www.nec.com/global/solutions/nsp/mwc2009/images/SON_whitepaper_V19_clean.pdf, 5 pages.

Nokia Siemens Networks, "Self-Organizing Network (SON)—Introducing Nokia Siemens Networks' SON Suite—an efficient and future-proof platform for SON" retrieved on Jul. 1, 2010, from http://www.nokiasiemensnetworks.com/sites/default/files/document/SelfOrganizing_Network_SON_White_Paper.pdf, 16 pages.

* cited by examiner

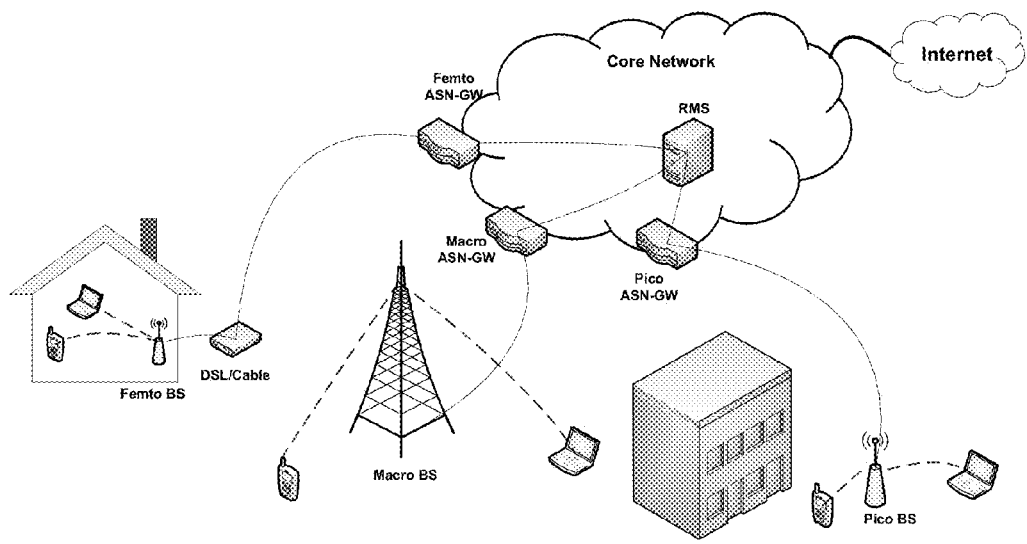
Figure 1 Hybrid Wireless Networks with Macro/Pico/Femto BSs and RMS
"Prior Art"
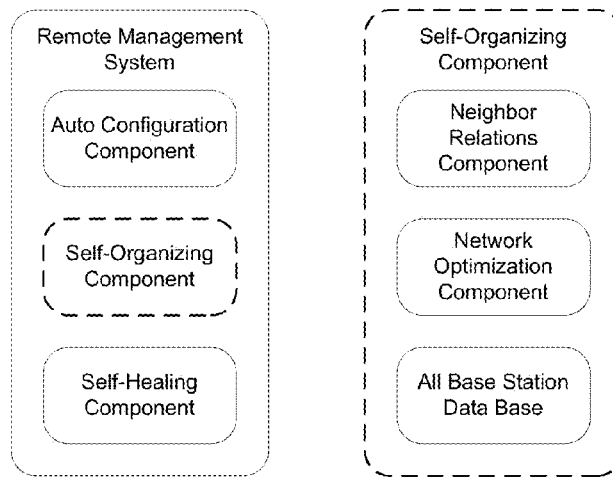
Figure 2 Remote Management System and Self-Organizing Component

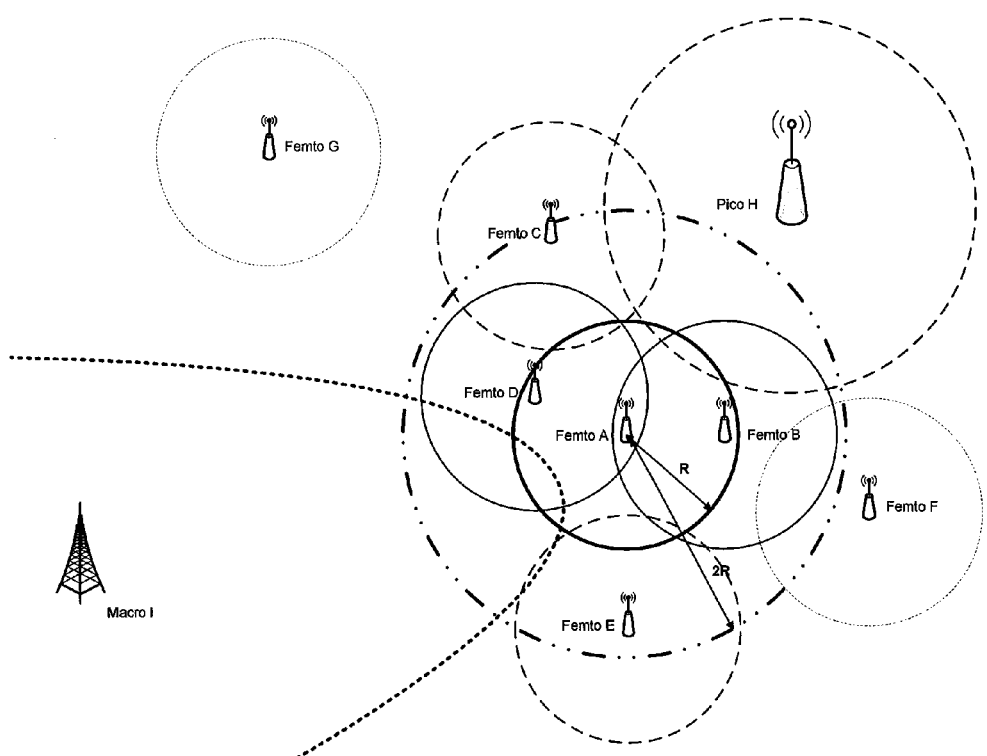
Figure 3 Neighbor Cells Relations

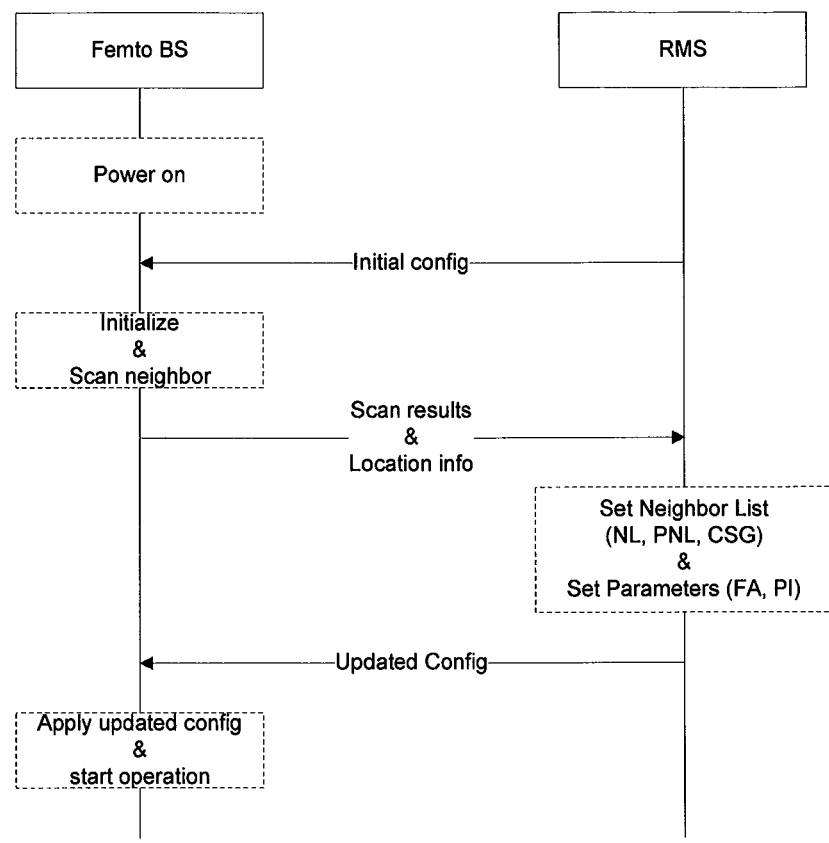
Figure 4 Initial Interactions between Femto BS and RMS

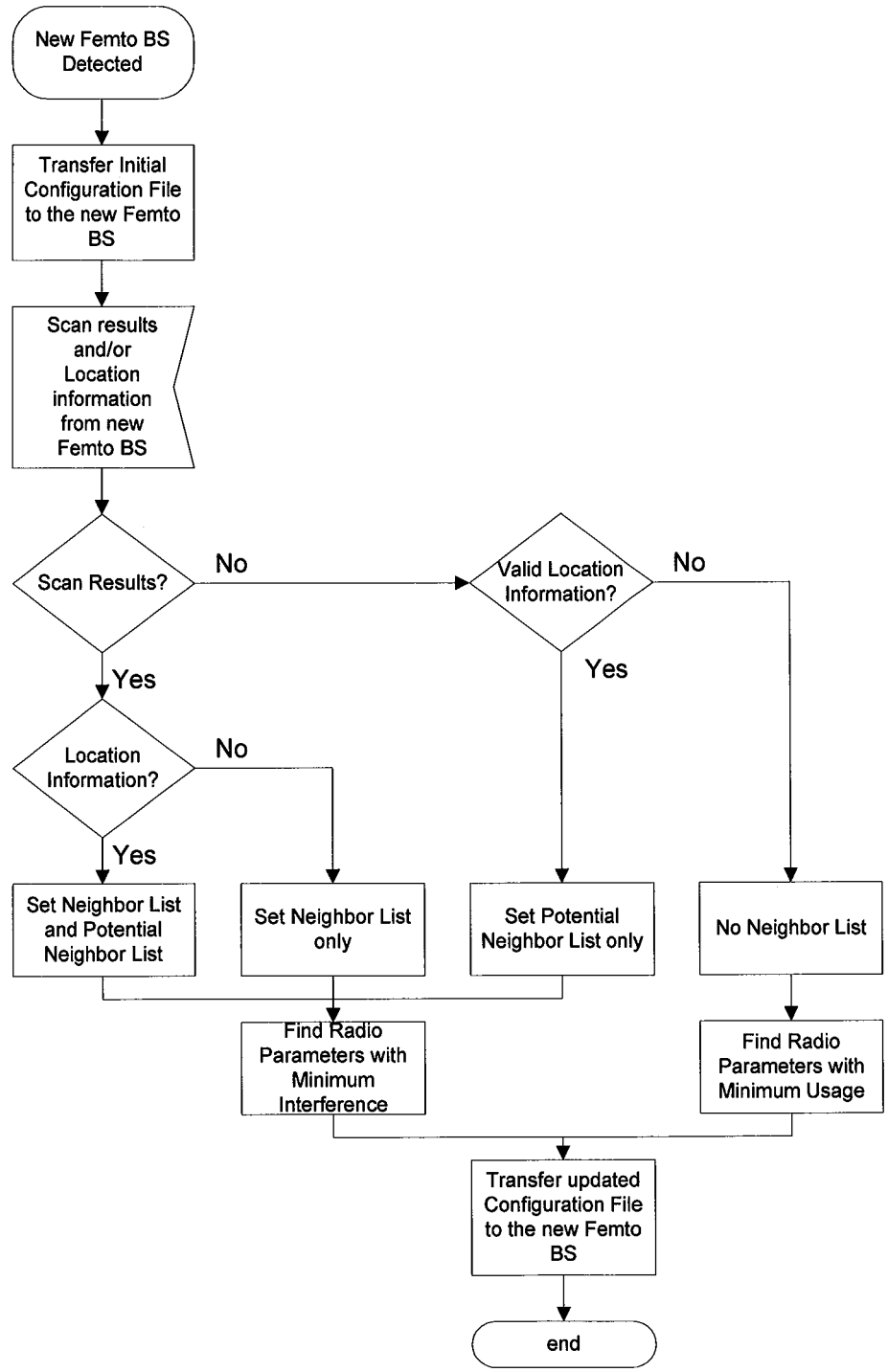
Figure 5 Initial Radio Parameter Decision at RMS

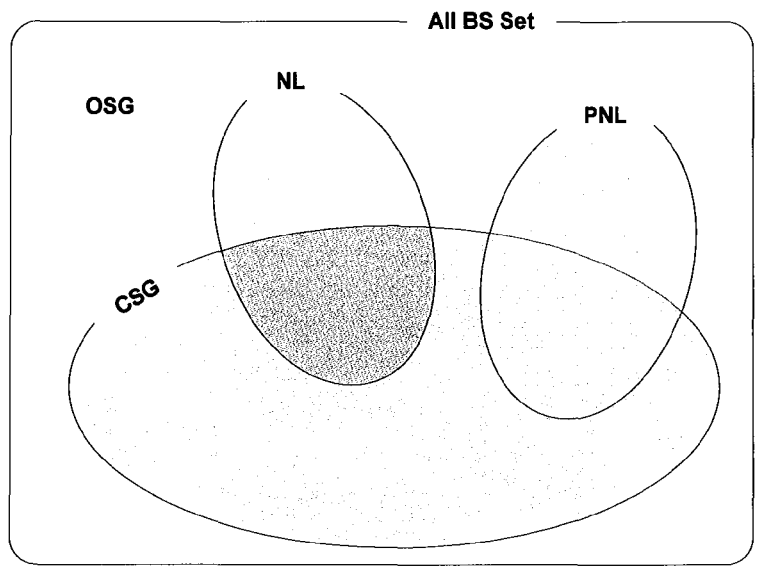
Figure 6 Neighbor List Subsets - NL, PNL, OSG and CSG
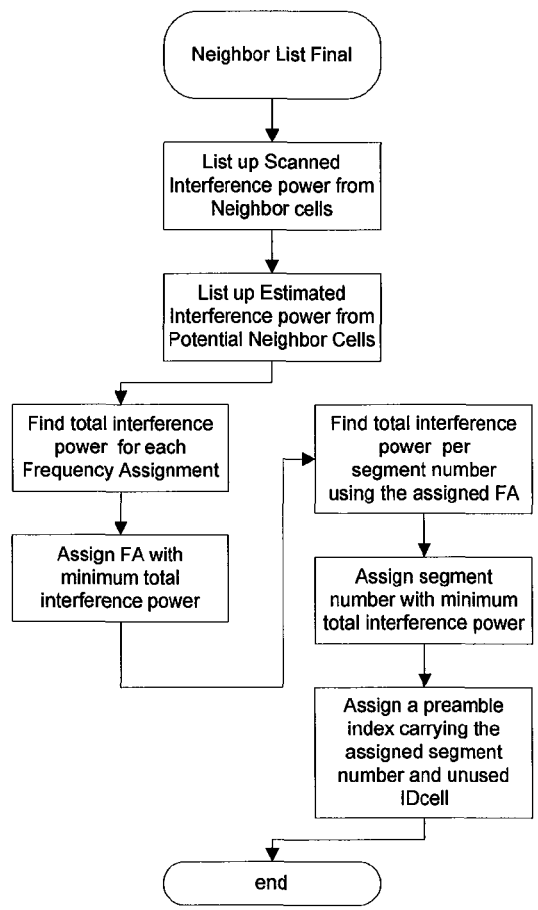
Figure 7 Processes of Frequency Assignment and Preamble Index Assignment

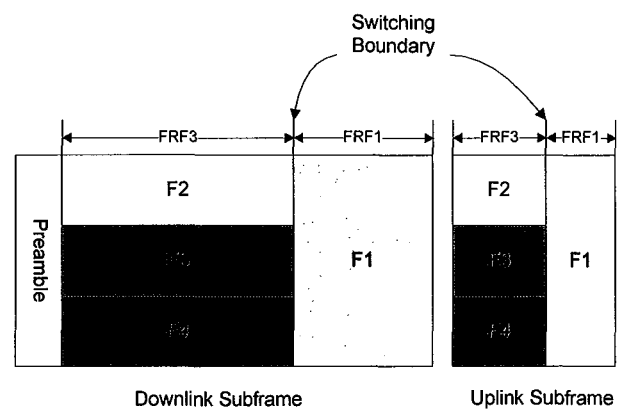
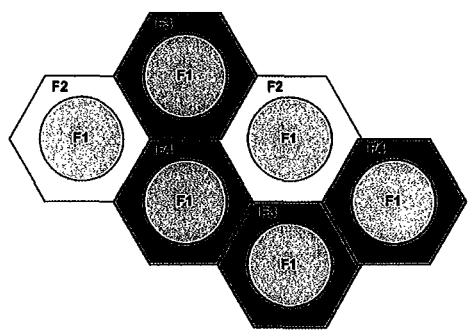
Figure 8 Exemplary Illustration of Fractional Frequency Reuse Usage

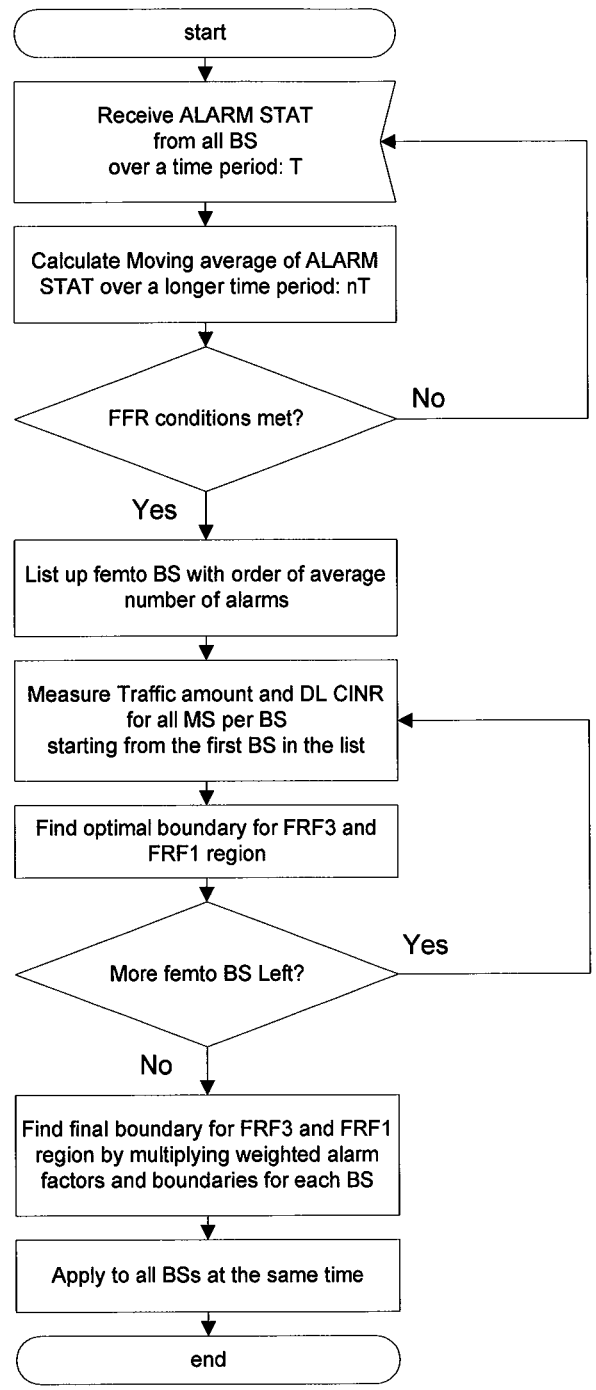
Figure 9 Fractional Frequency Reuse Triggering and Decision Making Procedure

REMOTE MANAGEMENT SYSTEM FOR SELF-ORGANIZING FEMTOCELLS

BACKGROUND

1. Technical Field

The present disclosure relates to remote management of femtocells in hybrid wireless networks, which include macro cells, pico cells and femtocells with CSG and OSG.

2. Description of the Related Art

Service providers are preparing for mass deployment of broadband wireless systems, such as, Mobile WiMAX or LTE (long-term evolution). In urban areas, macro base stations (BS) may cover a large area, but due to penetration loss and shadings from buildings, plural pico BSs and femto BSs need to be deployed. FIG. 1 shows an example of a hybrid wireless network that includes macro, pico and femto BSs altogether. Hereafter, we call areas covered by macro BS, pico BS and femto BS as macro cell, pico cell and femtocell, respectively. Even though FIG. 1 shows a Remote Management System (RMS) controlling the femtocells, pico cells and macro cells, the environment for the proposed method can be femtocells only, or pico cells only, or macro cells only, or any combination of femto, pico and macro cells.

Because the number of pico cells and femtocells is expected to be large, operators are expecting easy installation and maintenance to avoid high operation expenses. The RMS configures several parameters at the stages of network planning, deployment, and optimizations. Network planning includes neighbor cell list addition, hardware (HW) configuration, and capacity expansion. Network deployment is about self-locating and self-configuring, which are necessary for plug-and-play HW. Network optimization is the key area that needs a great many algorithms for radio parameter optimization, handover parameter optimization, interference control, and QoS (Quality of Service) parameter optimization.

BRIEF SUMMARY

The present disclosure is directed to an optimization method for radio parameters that reduces the exhaustive search at the femtocell level and also finds near optimal radio parameters for balanced cell coverage and cell capacity, minimizing interference between different cells.

FIG. 2 shows a simplified diagram of a RMS and a self-organizing component. The RMS has an auto-configuration component, a self-organizing component, and a self-healing component. The auto-configuration component directly communicates with femtocells and transfers initial configuration files and updated configuration files as needed. The self-organizing component manages a data base for all connected BSs and creates neighbor relations for each femtocell. Most importantly, the self-organizing component performs network optimization, which comprises radio parameter optimization, interference control, handover parameter optimization, and QoS parameter optimization.

In order for the RMS to work properly, initial radio parameter setting is very important. Even though some radio parameters can be changed to different values in the middle of service, it is much better to have optimal values from the beginning and avoid making changes later on. Radio parameters are directly related with neighbor cells, and hence, initial neighbor list setup is the most important step for the RMS.

As mentioned earlier, wireless networks today include macro cells, pico cells, and femtocells all in one service area and these three kinds are in service with different transmission power. Moreover, some closed subscriber group (CSG) femtocells will not allow a MS that is not registered to the femto BS and some open subscriber group (OSG) femtocells will allow any MS to be connected or handed over from macro cells.

Various algorithms with different objectives should be incorporated. Various objectives for the RMS include: continuous, optimized, and matched UL and DL coverage, optimized DL and UL capacity of the system, balanced trade-off between coverage and capacity, interference reduction, controlled cell edge performance, minimized human intervention in network management and optimization tasks, and energy savings.

The present disclosure provides a method of a centralized sequential frequency assignment that uses both radio scanning results from a femtocell and location information. The method minimizes the interference power and maximizes the receiver SINR (signal to interference ratio) for all mobile stations in order to maximize capacity of each femtocell. Also, an optimal preamble index is decided in similar fashion.

Even though the method is a centralized method and the RMS makes major decisions, each femtocell may help the RMS make an optimal decision by transferring more accurate radio scanning information, such as RSSI from nearby femtocells and frequency assignment for each femtocell.

In accordance with one aspect of the present disclosure, a remote management system (RMS) is provided for self-organizing, self-optimizing, and self-healing femtocells and it includes several algorithms such as, radio parameter optimization for interference control and autonomous neighbor relations. As for radio parameter optimization, algorithms for frequency assignment and preamble index assignment are introduced. Also, triggering conditions and decision making procedure for fractional frequency reuse is also introduced for one of network optimizing function at the RMS.

In accordance with the present disclosure, a method of self-organizing and managing a radio access network having a plurality of remote radio access point devices, and at least one management station, such as a remote management system, is provided. The method includes storing access point information in the remote management system for each remote radio access point device in the network; receiving remote radio access point device information at the remote management system when each remote radio access point device powers up; determining if the received remote radio access point device information contains location information or a list of neighbor remote radio access point devices or both location information and a list of remote radio access point device neighbors, and when only the list of neighbors is present, setting a neighbor list only and finding radio parameters with minimum interference with respect to the neighbor list only, when both the neighbor list and the location information are present, setting a neighbor list and potential neighbor list and finding the radio frequency parameters with minimal interference with respect to the neighbor list and the potential neighbor list, when only the location information is present, setting a potential neighbor list only and finding radio parameters with minimal interference with respect to the potential neighbor list only, and when no location information or neighbor list information is received, finding radio parameters with minimum usage; and generating and transferring to the remote radio access point device an updated configuration file that includes an assignment of an operating frequency from the applicable radio parameters.

In accordance with another aspect of the present disclosure, a system for remote management of self-organizing femtocells in a hybrid wireless is provided. The system includes a plurality of remote radio access point devices; and at least one remote management system coupled to the radio access network, the remote management system comprising: an auto-configuration component that directly communicates with each remote radio access point device within range of the remote management system and that transfers initial configuration files and updated configuration files to the remote radio access point device; a self-healing component that receives updated access point information from each of the remote radio access point devices within range of the remote management system and provides updated configuration files for the auto-configuration component; and a self-organizing component that manages a database for all remote radio access point devices within radio communication range of the remote management system that is configured to create neighbor relations for each remote radio access point device.

In accordance with another aspect of the present disclosure, a method is provided for initializing a remote femto base station utilizing a remote management system in a radio access network is provided. The method includes powering on the femto base station; transmitting an initial configuration file from the remote management system to the femto base station; initializing the femto base station with the initial configuration file; scanning neighbor femto base stations; transmitting the results of the scanning of neighbor femto base stations and transmitting the femto base station location information to the remote management system; the remote management system setting a neighbor list and radio frequency parameters in response to receipt of the transmission from the femto base station; generating an updated configuration file based on the generated neighbor list and radio frequency parameters; transmitting the updated configuration file from the remote management system to the femto base station; and applying the updated configuration file at the femto base station and starting operation.

In accordance with still yet a further aspect of the present disclosure, the remote management system is structured to implement fractional frequency reuse in accordance with the following steps: receiving at the remote management system alarm statistics from remote radio access point devices within communication range of the remote management system over a period of time; calculating in the remote management system a moving average of the alarm statistics over a longer period of time than the initial period of time; if the moving average statistic meets a triggering condition, then fractional frequency reuse boundary searching begins by: listing up remote radio access point devices that meet a predetermined number of alarms, measuring traffic amount at each remote radio access point device and collecting receiver SINR values measured at mobile devices that are connected to the remote radio access point device; finding an optimal boundary for each remote radio access point device; and finding a final boundary by multiplying weighted alarm factors and boundaries for each remote radio access point device, which final boundary is applied to all remote radio access point devices at the same time.

BRIEF DESCRIPTION OF THE SEVERAL VIEWS OF THE DRAWINGS

FIG. 1 is an illustration of a Hybrid Wireless Network with Macro/Pico/Femto BSs and RMS;

FIG. 2 illustrates a block diagram of a Remote Management System and Self-Organizing Component;

FIG. 3 illustrates Neighbor Cells Relations;

FIG. 4 illustrates initial interactions between Femto BS and RMS;

FIG. 5 is a flow chart of an initial radio parameter decision at RMS;

FIG. 6 is a Venn diagram of Neighbor List Subsets—NL, PNL, OSG and CSG;

FIG. 7 illustrates the processes of frequency assignment and preamble index assignment;

FIG. 8 is an exemplary illustration of fractional frequency reuse usage in multi cell sites; and FIG. 9 is a flow chart illustrating a fractional frequency reuse triggering and decision making procedure.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with remote communication devices and remote management systems, including but not limited to remote radio access point devices and remote management stations, have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Although the present disclosure is described in the context of femtocells and picocells as well as remote radio access point devices and remote management systems, it is to be understood that the present disclosure can be applied to other radio communication devices and remote management stations or systems, and the like. Thus, the present disclosure is not limited to the context described below.

In systems having plural femto BSs, there are potential interferers around the location where a new femto BS is to be added. Each femto BS has various radio frequency parameters provided by the RMS, such as frequency assignment (FA), preamble index (PI), fractional frequency reuse (FFR), transmission power, and handover threshold values (HO). In addition, parameters related to a network include the neighbor list, including potential neighbor list, the closed subscriber group (CSG) list, traffic load per femto BS, HO related network parameters, and radio resource management (RRM) related parameters.

Once a new femto BS is plugged in or connected to a network, its radio parameters should be chosen so that the overall interference level is minimized throughout the service area. While the decision is made at the RMS, the femto BS also has a very important role in the process. Depending on the availability of a scanning function at the femto BS, the detailed roles of femto BS and RMS are different.

A detailed analysis and algorithm descriptions are in the following section.

A. Neighbor Relations

For initial neighbor list setup, the RMS normally relies on scanning results from the newly added femto BS. However, there exist more neighbor cells that the femto BS might not be able to recognize in the first scanning phase. Relying on those scanned neighbor lists in finding optimal radio parameters would create unexpected interference levels around the newly added femtocell. When the number of femtocells is large, it is highly recommended to have more completed sets of neighbor lists in the initial stage so that radio parameters and resources can be adjusted and allocated optimally at the beginning.

FIG. 3 shows a pictorial illustration on relations between neighbor cells. For illustrative purposes, the present disclosure designates a femtocell A as having a radio coverage area with femto BS A. The range R is the radius of the defined coverage area.

When femto BS A is turned on, femtocells B, C, D, and E will be considered as neighbor cells and femtocell F and G are not neighbor cells. If we look into the details, femtocells B and D will be directly detectable from the femto BS A using a radio scanning function, but femtocells C and E are not detectable because their coverage area do not include the location of femto BS A. Hence, in the initial stage, femto BS A cannot detect femtocells C and E even though they are neighbor cells. However, these femtocells will be scanned and detected by MSs connected to the femto BS A later on, and then they will be considered as neighbor cells.

Also, pico cell H and macro cell I are neighbors to the femtocell A because their coverage areas are overlapping, and some MSs in the femtocell A will detect pico cell H or macro cell I, depending on the location of the MS. In the early stage, nearby macro and pico cells will be considered as potential neighbors based on their location information and shared DCD/UCD information Hence we define a neighbor list (NL) and a potential neighbor list (PNL) as:

NL: a neighbor list of adjacent femtocells that is approximately within the cell radius of the focused femtocell. That is, a list of cells that can be detected by the focused femto BS.

PNL: a potential neighbor list of adjacent femtocells that is approximately within two times of the cell radius of the focused femtocell but out of the radius of it. That is, a list of cells that cannot be detected by the focused femto BS but might be detected by the MS that is connected to the focused femto BS. The location information can be obtained at the femto BS using a global positioning system (GPS) or some other methods.

FIG. 4 shows the initial interaction between a newly added femto BS and the RMS. When a new femto BS is turned on, the initial configuration is downloaded from the RMS so that it can initialize and perform neighbor scanning Once scanning results and location information (e.g., GPS) is transferred to the RMS, the RMS can set the neighbor list (NL, PNL and CSG) and find an optimum set of radio parameter values (FA and PI) based on each neighbor's cell radio parameter values. When the RMS updates the configuration file with new radio parameter values, the newly added femto will start operation and allow the MS nearby to access to the femto BS.

FIG. 5 shows how initial radio parameters are decided at the RMS. A detail procedure in finding radio parameters is described later.

When the scanning function is available at the femto BS, it scans neighbor radio frequencies and measures their signal strengths. Also neighbor preamble indexes can be discovered at the femto BS level. This scanned and measured information can be transfer to the RMS so that it can make a determination of the optimal radio parameter values.

When the scanning function is not available at the femto BS, it simply transfers location information (such as GPS) to the RMS. The RMS, which maintains all location information of all femto BSs, can make decisions on radio parameter values based on location-based path loss estimation. In this case, the RMS also manages a 'neighbor BS list' for each femto BS based on location information.

FIG. 6 shows subsets of neighbor lists; NL, PNL, OSG and CSG. Some BSs in PNL can be moved to NL only if the scanning report from the MS in the cell indicates the corresponding BS is actually detected. Also, there could be some neighbor BSs that were not scanned and not located within 2 times of coverage from the newly added femtocell; when a pico cell or macro cell has a small overlapping coverage area with the femtocell, this situation may occur.

Only BSs in the set of NL∩OSG are broadcasted to the MS for HO purpose.

B. Radio Parameters Assignments

Frequency assignment is a major problem in deploying wireless networks. All femtocells share the same set of frequency bands, which leads to interference that should be minimized using efficient assignment of frequency bands. Hence, the objective of having a new FA is to maximize the capacity, i.e., maximize received SINR values for each mobile station while minimizing interference between cells.

Frequency Assignment

The procedure of initial frequency assignment is as follows;

1. The RMS sets a neighbor list (NL) and a potential neighbor list (PNL) for a femto BS
   a. NL—detected by the femtocell
   b. PNL—added by the RMS based on the location information from the femto BS 2. List up scanned RSSI values, i.e., interference power values measured at the femto BS from all NL BSs: $I_j^N$, j=1, 2, ..., $N_{NL}$ 3. List up estimated interference power values for all PNL BSs: $\tilde{I}_j^P$, j=1, 2, ..., $N_{PNL}$ 4. The interference power, $I_j$ is a function of $\phi$, the frequency assignment of the new femto BS and it can be expressed as:

$$I_j(\phi dB)=P_j(dB)+G_j(dB)-PL_j(dB)+ACLR_j(\phi dB),$$

where
  $P_j(dB)$ is the transmission power of j-th femto BS
  $G_j(dB)$ is the antenna gain of j-th femto BS
  $PL_j(dB)$ is the path loss between j-th femto BS and the new femto BS, and
  $ACLR_j(\phi,dB)$ is the adjacent channel leakage ratio between the j-th femto BS and the new femto BS; this value is directly dependent on the frequency assignment that the new femto BS uses 5. The average CINR values for each MS in the new femto BS can be written as:

$$\gamma_i = \frac{S_i}{\sum_{i=1}^{N} I_{ij} + N_0} \approx \frac{S_i}{\sum_{i=1}^{N_{NL}} I_j^N + \sum_{i=1}^{N_{PNL}} \tilde{I}_j^P + N_0}$$

where Iij is the measured interference power coming from j-th BS at the i-th MS.

6. Find a frequency assignment φ that minimizes $$\sum_{j=1}^{N_{NL}} I_j^N + \sum_{j=1}^{N_{PNL}} \tilde{I}_j^P$$

FIG. 7 shows the processes of frequency assignment and preamble index assignment. For both cases, assignments are done so that the interference level is minimized. For preamble index assignment, a segment number needs to be decided first. Then, the preamble index is chosen based on available combinations of segment number and available IDcells. For uplink, different frame numbers make different seed for the PRBS generator even when IDcells are the same. However, the downlink PRBS is totally dependent on IDcell and segment number.

For the preamble index assignment, the decision making process is as follows:
1. Once the frequency assignment is done, the interference power from each BS is known.
2. Compare aggregated values of interference power from BSs using the same segment number; 0, 1, or 2.
3. Assign a segment number for the lowest values among results in 2.
4. Find a preamble index, carrying unused IDcell and the assigned segment number.

FFR Management at RMS

Fractional Frequency Reuse (FFR) can be utilized for certain cell sites, where many subscribers are suffering from co-channel interference, especially when the operator has only one frequency assignment for the service. The radio frame can be divided into two regions, one with an FRF3 region and the other with an FRF1 region.

FRF3 region
  A full band is divided by three sub-bands and each BS use only one sub-band.
  F2 sub-band is used by BS that has segment number of '0'
  F3 sub-band is used by BS that has segment number of '1'
  F4 sub-band is used by BS that has segment number of '2'
FRF 1 region
  A full band is used by each BS The MS that is located near the cell edge and suffering from co-channel interference can have resources allocated in the FRF3 region, and there will be much less co-channel interference because adjacent cells shall allocate resources in other sub-bands in the FRF3 region.

The key issue in providing FFR is that all the cell sites should have the same switching boundary for the FRF3 region and the FRF1 region. Otherwise, at certain time instances, cell site within the FRF1 region can be a strong co-channel interferer to a cell site within the FRF3 region.

Because FFR is a well-known scheme and many publications describe how it works, it will not be described in detail herein. The present disclosure proposes when to use FFR and how an RMS handles it.

FIG. 8 shows an example of FFR usage in multi cell sites. First a number of OFDMA symbols are used for ⅓ frequency allocation and remaining OFDMA symbols are used for full frequency allocation.

Because some cells may have more MSs near a cell center and some cells may have more MSs near the cell edge, having a synchronized boundary for FFR use can lead to less spectral efficiency overall. Hence, FFR should be triggered in an extreme case, like when too many subscribers are being disconnected and the femto BS is receiving many alarm signals.

The triggering condition and decision making procedure for FFR is as follows:
1. The RMS receives alarm statistics from all BSs over a time period T.
   a. The value of 'T' is a system variable and dependent on site characteristics.
2. The RMS calculates a moving average of the alarm statistics over a longer time period nT, where n is an integer.
   a. The value of 'n' is a system variable and dependent on site characteristics.
3. If the average statistics meet triggering conditions, the FFR boundary searching process begins.
   a. There could be plural triggering conditions, such as an average or total number of alarm reports, or a variance of a number of alarm reports.
   b. The triggering conditions will be set very high so that FFR triggering happens very rarely.
4. The RMS requests all BSs measure traffic amount and CINR for each MS connected to them.
5. Find an optimal boundary for each BS starting from the BS with highest traffic amount
   a. Measure CINR values for all MSs and list up in highest CINR order: $\gamma_i$, i=1, 2, 3, . . . , $M_j$, where $M_j$ is the number of MSs in j-th cell
   b. List up all MSs with traffic amount: $\Phi_i$, i=1, 2, 3, . . . , $M_j$.
      i. The traffic amount could be either the number of total packets or bytes.
   c. Divide groups for ⅓ frequency and full frequency based on CINR values.
      i. FRF1 group: $\gamma_i$, i=1, 2, 3, . . . , K, where, $\gamma_K \geq \gamma_{TH}$
      ii. FRF3 group: $\gamma_i$, i=K+1, . . . , $M_j$, $\gamma_{K+1} < \gamma_{TH}$
   d. Find MCS levels for all MSs based on their measured CINR values: $R_i$, i=1, 2, 3, . . . , $M_j$.
      i. $R_i \in \{1/6, 1/4, 1/2, 1, 3/2, 2, 3, 4, 9/2, 5\}$ from MCS levels of {QPSK ½ 6R, QPSK ½ 4R, QPSK ½ 2R, QPSK ½, QPSK ¾, 16QAM ½, 64QAM ½, 64QAM ⅔, 64QAM ¾, 64QAM ⅚}.
   e. Calculate total resources to be used and compare:
      i. FRF1 resources:

$$\Delta_{FRF1} = \sum_{i=1}^{K} \Phi_i / R_i$$

and
      ii. FRF3 resources:

$$\Delta_{FRF3} = \sum_{i=K+1}^{M} \Phi_i R_i$$

f. Calculate the boundary:
      i. ⅓ frequency region symbol number, $$L_{j,FRF3} = L_j \cdot \frac{\Delta_{FRF3}}{\Delta_{FRF1}/3 + \Delta_{FRF3}},$$

where $L_{j,FRF3}$ is the optimal number of OFDMA symbols for downlink sub frame of j-th cell and $L_j$ is the total number of downlink OFDMA symbols.

6. Find the final symbol number for ⅓ frequency region using an average or weighted average of traffic amount or alarm statistics, depending on the cell sites conditions.

7. Broadcast the symbol number for ⅓ frequency region to all BSs.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

For example, in accordance with further aspect of the present disclosure, the remote management system is structured to implement fractional frequency reuse in accordance with the following steps:

receiving at the remote management system alarm statistics from remote radio access point devices within communication range of the remote management system over a period of time;

calculating in the remote management system a moving average of the alarm statistics over a longer period of time than the initial period of time; if the moving average statistic meets a triggering condition, then fractional frequency reuse boundary searching begins by:

listing up remote radio access point devices that meet a predetermined number of alarms, measuring traffic amount at each remote radio access point device, and collecting receiver SINR values measured at mobile devices that are connected to the remote radio access point device;

finding an optimal boundary for each remote radio access point device; and finding a final boundary by multiplying weighted alarm factors and boundaries for each remote radio access point device, which final boundary is applied to all remote radio access point devices at the same time.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of self-organizing and managing a radio access network having a plurality of remote radio access point devices, the network further including at least one remote management system, the method comprising:

storing access point information in the remote management system for each remote radio access point device in the network;

receiving information at the remote management system from each device when each device powers up;

determining, for each device that sent information, if the received information contains location information or a list of neighbor devices or both location information and a list of neighbors, and when only the list of neighbors is present, setting a neighbor list only and finding radio parameters with minimum interference with respect to the neighbor list only, when both the neighbor list and the location information are present, setting a neighbor list and potential neighbor list and finding the radio frequency parameters with minimal interference with respect to the neighbor list and the potential neighbor list, when only the location information is present, setting a potential neighbor list only and finding radio parameters with minimal interference with respect to the potential neighbor list only, and when no location information or neighbor list information is received, finding radio parameters with minimum usage; and generating and transferring to each respective device an updated configuration file that includes an assignment of an operating frequency from the applicable radio parameters.

2. The method of claim 1, comprising an initial step of setting a level of quality of service in the remote management system to be used in finding the radio parameters.

3. The method of claim 1 wherein the step of finding the radio parameters comprises a method of operating frequency assignment that comprises:

generating a list of scanned interference power from neighbor cells for a respective device;

generating a list of estimated interference power from potential neighbor cells if applicable to the device;

finding total interference power for each frequency assignment for the device; and assigning a frequency assignment with minimal total interference power.

4. The method of claim 3 wherein the frequency assignment further comprises:

finding total interference power per segment number using the assigned frequency assignment for the respective device;

assigning a segment number with the minimum total interference power; and assigning a preamble index carrying the assigned segment number and an unused ID cell to the respective device.

5. The method of claim 2, comprising continually receiving access point information from each device and reconfiguring each respective device in response to changes in the received access point information in order to maintain the level of quality of service.

6. A radio access network system configured to support any remote radio access point device with autonomous, dynamic configuration of radio frequency and network parameters, the system comprising:

a plurality of remote radio access point devices; and at least one remote management system coupled to the radio access network, the remote management system including:

an auto-configuration component that directly communicates with each remote radio access point device within range of the remote management system and that transfers initial configuration files and updated configuration files to the remote radio access point devices;

a self-healing component that receives updated access point information from each of the remote radio access point devices within range of the remote management system and provides updated configuration files for the auto-configuration component; and a self-organizing component that manages a database for all remote radio access point devices within remote communication range of the remote management system, the database configured to create neighbor relations for each remote radio access point device;

the remote management system configured to perform the following method:
- storing access point information in the management station for each remote radio access point device in the network;
- receiving information at the remote management system from each device when each device powers up;
- determining, for each device that sent information, if the received information contains location information or a list of neighbor devices or both location information and a list of neighbors; and
  - when only the list of neighbors is present, setting a neighbor list only and finding radio parameters with minimum interference with respect to the neighbor list only,
  - when both the neighbor list and the location information are present, setting a neighbor list and potential neighbor list and finding the radio frequency parameters with minimal interference with respect to the neighbor list and the potential neighbor list,
  - when only the location information is present, setting a potential neighbor list only and finding radio parameters with minimal interference with respect to the potential neighbor list only, and
  - when no location information or neighbor list information is received, finding radio parameters with minimum usage; and
- generating and transferring to each respective device an updated configuration file that includes an assignment of an operating frequency from the applicable radio parameters.

7. The system of claim 6 wherein the self-organizing component is structured to perform network optimization, which comprises radio parameter optimization, interference control, handover parameter optimization, and quality of service parameter optimization.

8. The system of claim 6 wherein the method includes the initial step of setting a level of quality of service in the remote management system.

9. The system of claim 8 wherein the method further includes continually receiving information from each respective remote radio access point device, the information comprising access point information, and reconfiguring each respective remote radio access point device in response to changes in the access point information in order to maintain the level of quality of service.

10. The system of claim 6, wherein the remote management system is configured to assign frequencies to each of the remote radio access point devices in accordance with the following method:
- generating a list of scanned interference power from neighbor cells for a respective remote radio access point device;
- generating a list of estimated interference power from potential neighbor cells if applicable to the remote radio access point device;
- finding total interference power for each frequency assignment for the remote radio access point device; and
- assigning to the remote radio access point device a frequency assignment with minimal total interference power.

11. The system of claim 10 wherein the remote management system is configured to perform the following additional steps with respect to assignment of frequencies:
- finding total interference power per segment number using the assigned frequency assignment for the respective remote radio access point device;
- assigning a segment number with the minimum total interference power; and
- assigning a preamble index carrying the assigned segment number and unused ID cell to the respective remote radio access point device.

12. The system of claim 6 wherein the remote management system is structured to implement fractional frequency reuse in accordance with the following method:
- receiving at the remote management system alarm statistics from remote radio access point devices within communication range of the remote management system over a period of time;
- calculating in the remote management system a moving average of the alarm statistics over a longer period of time than the initial period of time;
- if the moving average statistic meets a triggering condition, then fractional frequency reuse boundary searching begins by:
  - listing up remote radio access point devices that meet a predetermined number of alarms, measuring traffic amount at each remote radio access point device and collecting receiver SINR values measured at mobile devices that are connected to the remote radio access point device,
  - finding an optimal boundary for each remote radio access point device, and
  - finding a final boundary by multiplying weighted alarm factors and boundaries for each remote radio access point device, which final boundary is applied to all remote radio access point devices at the same time.

13. A method for initialization of a remote radio access point device by a remote management system in a radio access network, the method comprising:
- powering on the remote radio access point device;
- transmitting an initial configuration file from the remote management system to the remote radio access point device;
- initializing the remote radio access point device with the initial configuration file;
- scanning neighbor remote radio access point devices with the remote radio access point device;
- transmitting from the remote radio access point device to the remote management system the results of the scanning of neighbor remote radio access point devices;
- the remote management system setting a neighbor list and radio frequency parameters in response to receipt of the transmission from the remote radio access point device, the setting including:
  - receiving information at the remote management system from each device when each device powers up;
  - determining, for each device that sent information, if the received information contains location information or a list of neighbor devices or both location information and a list of neighbors, and
  - when only the list of neighbors is present, setting a neighbor list only and finding radio parameters with minimum interference with respect to the neighbor list only,
  - when both the neighbor list and the location information are present, setting a neighbor list and potential neighbor list and finding the radio frequency parameters with minimal interference with respect to the neighbor list and the potential neighbor list, when only the location information is present, setting a potential neighbor list only and finding radio parameters with minimal interference with respect to the potential neighbor list only, and when no location information or neighbor list information is received, finding radio parameters with minimum usage;

generating in the remote management system an updated configuration file based on the generated neighbor list and radio frequency parameters;

transmitting the updated configuration file from the remote management system to the remote radio access point device; and applying the updated configuration file at the remote radio access point device.

14. The method of claim 13 wherein setting the neighbor list and radio frequency parameters at the remote management system comprises setting a neighbor list, a potential neighbor list, and a closed subscriber group, and wherein setting the radio frequency parameters comprises setting a frequency assignment.

15. The method of claim 14, comprising continually receiving neighbor scanning reports from mobile devices via remote radio access point devices to which those mobile devices are connected, and the remote management system updating the neighbor list for each remote radio access point device.

16. The method of claim 14, comprising continually transmitting access point information from the remote radio access point device to the remote management system, and the remote management system sending an updated configuration file to the remote radio access point device in response to changes in the access point information in order to maintain a level of quality of service.

17. The method of claim 15, comprising an initial step of setting a level of quality of service in the remote management system.

* * * * *